(12) United States Patent
Ramanan et al.

(10) Patent No.: US 9,220,022 B2
(45) Date of Patent: Dec. 22, 2015

(54) LTE USER PRESENCE DETECTION FOR SMALL CELL PLACEMENT

(71) Applicant: Alcatel-Lucent USA Inc., Murray Hill, NJ (US)

(72) Inventors: Buvaneswari Ramanan, Murray Hill, NJ (US); Lawrence Drabeck, Murray Hill, NJ (US); Tod Sizer, II, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 56 days.

(21) Appl. No.: 13/799,693

(22) Filed: Mar. 13, 2013

(65) Prior Publication Data

US 2014/0274073 A1 Sep. 18, 2014

(51) Int. Cl.
*H04W 4/02* (2009.01)
*H04W 24/02* (2009.01)
*H04W 16/18* (2009.01)
*H04W 84/04* (2009.01)

(52) U.S. Cl.
CPC .............. *H04W 24/02* (2013.01); *H04W 16/18* (2013.01); *H04W 84/045* (2013.01)

(58) Field of Classification Search
CPC ... H04W 84/045; H04W 24/02; H04W 24/00; H04W 16/16; H04W 16/18; H04W 16/32; H04W 28/0289; H04W 28/08; H04W 16/08; H04W 28/02; H04W 16/20
USPC ............................... 455/422.1, 423, 446–453
See application file for complete search history.

(56) References Cited

U.S. PATENT DOCUMENTS

| | | | | |
|---|---|---|---|---|
| 6,971,063 | B1* | 11/2005 | Rappaport et al. | 715/733 |
| 2003/0014213 | A1* | 1/2003 | Yokota | 702/150 |
| 2006/0141998 | A1* | 6/2006 | Kennedy et al. | 455/423 |
| 2007/0054670 | A1* | 3/2007 | Kalika et al. | 455/446 |
| 2010/0120447 | A1* | 5/2010 | Anderson et al. | 455/456.1 |
| 2012/0051265 | A1* | 3/2012 | Shen et al. | 370/254 |
| 2013/0040648 | A1* | 2/2013 | Yang et al. | 455/446 |
| 2013/0053047 | A1* | 2/2013 | Rai et al. | 455/448 |
| 2013/0196615 | A1* | 8/2013 | Zalmanovitch et al. | 455/405 |
| 2014/0141788 | A1* | 5/2014 | Puthenpura et al. | 455/449 |

OTHER PUBLICATIONS

Metro Cells Placing Coverage and Capacity Where Its Needed by Alcatel-Lucent, dated Feb. 2012.*
Wang, Yafeng et al. "A Novel Channel Estimation Algorithm for Sounding Reference Signal in LTE Uplink Transmission". Porceddings of ICCTA2009. Wireless Theories & Technologies (WT&T) Lab. 2009 IEEE.

(Continued)

*Primary Examiner* — Daniel Lai
(74) *Attorney, Agent, or Firm* — Harness, Dickey & Pierce, P.L.C.

(57) ABSTRACT

One embodiment includes a method for determining a target location for a metro cell base station by calculating, via at least one monitoring device, at least one of a number of user equipments within a range of the at least one monitoring device and a radio frequency (RF) level of at least one macro cell base station. The method further includes determining, via the at least one monitoring device, the target location for the metro cell base station based on at least one of the calculated number of user equipments within the range and the calculated RF level of the at least one macro cell base station.

20 Claims, 5 Drawing Sheets

(56) References Cited

OTHER PUBLICATIONS

Chu, David C. "Polyphase Codes with Good Periodic Correlation Properties" IEEE Transactions on Information Theory, Jul. 1972.

Bertrand, Pierre "Channel Gain Estimation from Sounding Reference Signal in LTE" Cellular Infrastructure Systems—Texas Instruments Incorporated. 2011 IEEE.

* cited by examiner

Monitoring Device

LTE USER PRESENCE DETECTION FOR SMALL CELL PLACEMENT

BACKGROUND

To meet the demands of ever growing data traffic over communication networks, operators augment macro cell base stations by placing metro cell base stations at strategic locations. However, installing a metro cell base station at a location randomly or without having sufficient information on the benefits of installing the metro cell base station at such location may provide sub-optimal benefits from such installation. For example, if the User Equipment (UE) density in that location turns out to be low, then the benefits of the metro cell base station will also be low. Furthermore, incurring costs associated with installing a metro cell base station at a sub-optimal location prior to realizing the insufficiencies of having the metro cell base station at the sub-optimal location does not make sound financial sense for a network operator.

Existing solutions for determining whether a particular target location may be suitable for installing a metro cell base station use triangulation of mobile devices and measurement reports recorded at a Radio Network Controller of a network. Several different geo-location techniques such as Time Difference of Arrival (TDOA) and enhanced Cell ID (ECID) are used to locate the mobile devices. However, these techniques lack the accuracy necessary to identify the appropriate metro cell base station locations due to geo-location errors. This inaccuracy has been shown in field trials of such method, where metro cell base stations do not perform well (e.g., have insufficient traffic) when placement is chosen based on such techniques.

What is lacking currently is the ability for a network operator to obtain accurate information on the benefits of placing a metro cell base station at a proposed location prior to actual installation of a metro cell base station.

SUMMARY

Example embodiments relate to methods and an apparatuses for using a monitoring device such as Long Term Evolution (LTE) radio frequency (RF) sniffer, which may be placed at a target location and passively monitor a control channel such as a LTE Sounding Reference Signal (SRS) between the macro cell base station and nearby users. The monitoring device may provide statistics on the number of users within a range of the monitoring device, the amount of data activity by each one of the users in the range and an amount of interference from the macro cell base station at the location of the monitoring device. Analysis of such statistics may provide more accurate information regarding the suitability of a target location for installing a metro cell base station.

In one example embodiment, a method for determining a target location for a metro cell base station includes calculating, via at least one monitoring device, at least one of a number of user equipments within a range of the at least one monitoring device and a radio frequency (RF) power level of at least one macro cell base station. The method further includes determining, via the at least one monitoring device, the target location for the metro cell base station based on at least one of the calculated number of user equipments within the range and the calculated RF level of the at least one macro cell base station.

In yet another example embodiment, the method further includes calculating an amount of data activity associated with each one of the user equipments within the range, wherein the determining the target location is further based on the calculated amount of data activity.

In yet another example embodiment, the method further includes monitoring, via the at least one monitoring device, data associated with at least one control channel between a plurality of user equipments and the at least one macro cell base station. The number of user equipments, the amount of data activity and the RF level are calculated based on the monitored data.

In yet another example embodiment, the method includes calculating the number of user equipments within the range of the monitoring device by calculating a power level of a user equipment from among the plurality of user equipments monitored by the at least one monitoring device, comparing the power level with a power threshold of the at least one monitoring device, and determining whether the user equipment is within the range based on the comparing of the power level of the user equipment with the power threshold.

In yet another example embodiment, the method includes calculating the amount of data activity by determining a correlation between the monitored data and a measurement record for each connection established between each one of the user equipments and the at least one macro cell base station, the correlation being based on at least one of an SRS offset, the power level and a time at which the power level is calculated.

In yet another example embodiment, the method includes comparing the calculated number of user equipments with a first threshold, comparing the amount of data activity with a second threshold and comparing the calculated RF level with a third threshold, the third threshold being determined such that if the metro cell base station is placed at the target location, no substantial signal interference from the at least one macro cell base station will be experienced by the metro cell base station. Furthermore, the determining of the target location for the metro cell base station is based upon the comparing of the calculated number of user equipments with the first threshold, the comparing of the amount of data activity with a second threshold and the comparing of the calculated RF level with the third threshold.

In yet another example embodiment, the method includes triangulating the target location based on the comparing and a correlation of additional monitored data and additional comparisons received from an additional monitoring device.

In another example embodiment, a monitoring device for determining a target location for a metro cell base station includes a processor configured to calculate at least one of a number of user equipments within a range of the monitoring device and a radio frequency (RF) level of at least one macro cell base station. The processor is further configured to determine the target location for the metro cell base station based on at least one of the calculated number of user equipments within the range and the calculated RF level of the at least one macro cell base station.

In yet another example embodiment, the processor is further configured to calculate an amount of data activity associated with each one of the user equipments within the range, wherein the processor further determines the target location based on the calculated amount of data activity.

In yet another example embodiment, the processor is further configured to monitor data associated with at least one control channel between a plurality of user equipments and the at least one macro cell base station. The processor calculates the number of user equipments, the amount of data activity and the RF level based on the monitored data.

In yet another example embodiment, the processor is further configured to monitor data associated with at least one control channel between a plurality of user equipments and the at least one macro cell base station. The processor calculates the number of user equipments, the amount of data activity and the RF level based on the monitored data.

In yet another example embodiment, the processor is further configured to calculate the number of user equipments by calculating a power level of a user equipment from among the plurality of user equipments monitored by the monitoring device, comparing the power level with a power threshold of the monitoring device, and determine whether the user equipment is within the range based on comparing the power level of the user equipment with the power threshold.

In yet another example embodiment, the processor is further configured to calculate the amount of data activity by determining a correlation between the monitored data and a measurement record for each connection established between the user equipment and the at least one macro cell base station, the correlation being based on an SRS offset, the power level and a time at which the power level is calculated.

In yet another example embodiment, the processor is further configured to compare the calculated number of user equipments with a first threshold, compare the calculated amount of data activity with a second threshold and the calculated RF level with a third threshold, the third threshold being determined such that if the metro cell base station is placed at the target location, no substantial signal interference from the at least one macro cell base station will be experienced by the metro cell base station. The processor determines the target location for the metro cell base station based on the comparing of the number of user equipments with the first threshold, the comparing of the calculated amount of data activity with the second threshold and the comparing of the RF level with the third threshold.

In yet another example embodiment, upon placing an additional monitoring device at an additional location, the processor determines the target location by triangulating the target location based on the comparing and a correlation of additional monitored data and additional comparisons received from an additional monitoring device.

In yet another example embodiment, the additional monitored data includes at least one of an amount of data activity of each of a plurality of user equipments within a range of the additional monitoring device, the RF level of the macro cell base station at the additional monitoring device and data associated with at least one control channel between the plurality of user equipments and the at least one macro cell base station. Furthermore, the additional comparisons include at least one of a comparison between the number of user equipment within the range of the additional monitoring device and the first threshold, a comparison between the amount of data activity associated with each one of the number of user equipment within the range of the additional monitoring device, and a comparison between the RF level of the at least one macro cell base station at the additional monitoring device and the third threshold.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
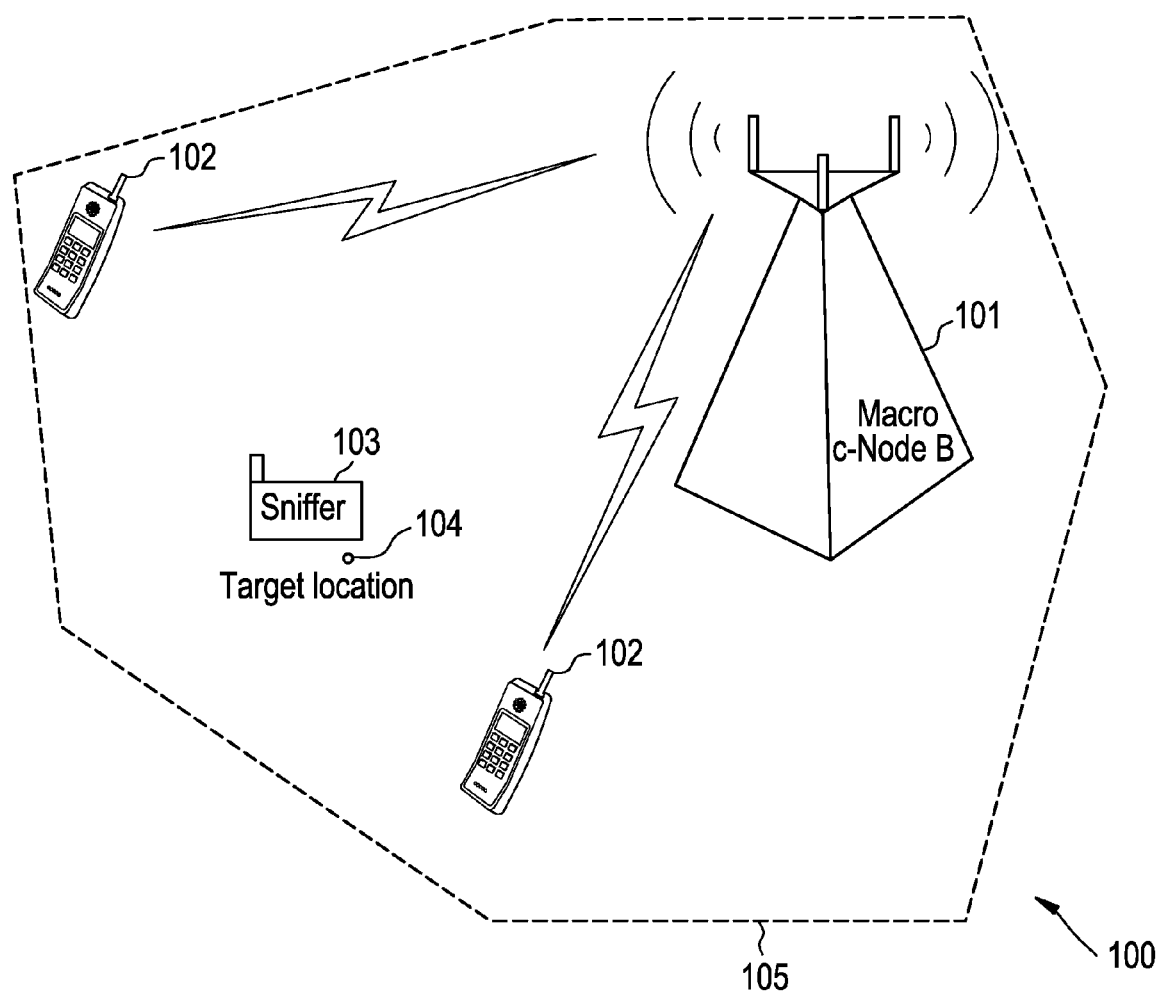
FIG. 1 illustrates a communication system according to an example embodiment.

Various embodiments will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (VAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and $3^{rd}$ Generation Partnership Project LTE (3GPP LTE).

FIG. 1 illustrates a communication system according to an example embodiment. FIG. 1 depicts a communication system 100 that includes a macro cell base station 101 and a plurality of user equipments 102. The macro cell base station 101 corresponds to the technology based on which the communication system 100 may operate. For example, the macro cell base station 101 may be any one of, but not limited to, an LTE evolved NodeB (e-NodeB) controller in an LTE network, a base station in a GSM network, etc. The user equipments 102 may be any device capable of establishing a communication with the macro cell base station 101 including, but not limited to, a cellular telephone, a PDA, a laptop, a tablet computer, etc. A monitoring device such as an LTE radio frequency (RF) sniffer 103, which will be described below in relation to FIG. 2, may be placed at a target location 104 within the coverage area 105 of the communication system 100. As will be further explained in relation to FIG. 3, the sniffer 103 may be placed at or near the border of the coverage area 105, where the sniffer 103 is able to detect and monitor control channel information of multiple neighboring macro cell base stations.

Figure 2:
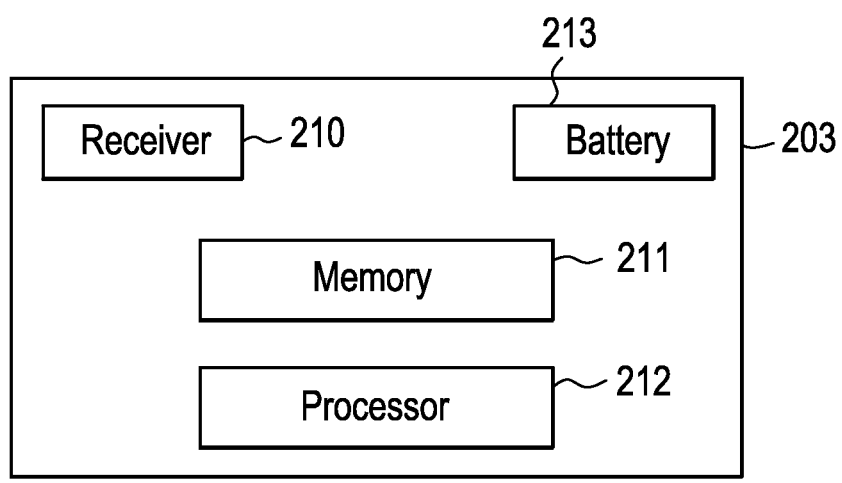
FIG. 2 illustrates the components of a monitoring device according to an example embodiment.

FIG. 2 illustrates the components of a monitoring device according to an example embodiment. The RF Sniffer 203 includes a receiver 210 via which it may receive configuration data, signals from a network operator at a remote location and/or signals from other RF sniffers that may exist in the vicinity of the RF sniffer 203. The receiver 210 includes a first component for receiving DL signals from the macro cell base station and a second component for receiving UL signals from a UE communicating with the macro cell base station. The receiver 210 may further include a third component for receiving communication signals transmitted based on IEEE 802.11 standards. The third component additionally has a transmitter for transmitting communication signals based on IEEE 802.11 standards. The transmitter enables the RF sniffer 203 to receive and/or transmit configuration data signals and/or signals from other RF sniffers over IEEE 802.11 communication links via surrounding IEEE 802.11 hotspots The sniffer 203 further includes a memory 211 on which various types of data monitored by the sniffer 203 may be stored. The memory 211 may be any one of, but not limited to, a volatile memory such as a static random access memory (SRAM), a dynamic random access memory (DRAM), a flash memory, a non-volatile memory such as a magnetic storage device including a hard disk, a floppy disk, an optical disc, etc. Sniffer 203 includes a battery 213. The battery 213 may be any type of battery for enabling a device to operate for a period of time without a power connection to an AC power source. The battery 213 may be any one of, but not limited to, a rechargeable battery such as a lead-acid battery, a lithium-ion battery, a nickel-zinc battery, a primary cell battery such as an alkaline battery, a dry cell battery, a lithium battery, etc.

The sniffer 203 further includes a processor 212 for carrying out a process such as the process described below in relation to FIG. 3, for monitoring data and determining suitability of a target location for placement of a metro cell base station. The RF sniffer 203 may be configured by an operator so as to be capable of being at the target location for a certain period of time ranging from a few days to a few weeks. This range of time varies depending on various factors including, but not limited to, a frequency of monitoring data, battery capacity, transmission capability, etc.

As explained above, the RF sniffer 203 may include a transmitter that, at a minimum, communicates with the operator at a remote location and/or other sniffers located nearby. In an example embodiment, the monitored data may not be stored on the memory 211 of the RF sniffer 203, but rather be communicated to the remote location for storage in a database and/or analysis by a network operator. Furthermore, as will be described below in relation to FIG. 3, in case of having more than one sniffer, a triangulation may be performed to determine the target location. Accordingly, each sniffer communicates its data and observations to every other sniffer and the processor of each RF sniffer may perform the triangulation. Alternatively, the process of triangulation may also be carried out on a central processor at a remote location.

Figure 3:
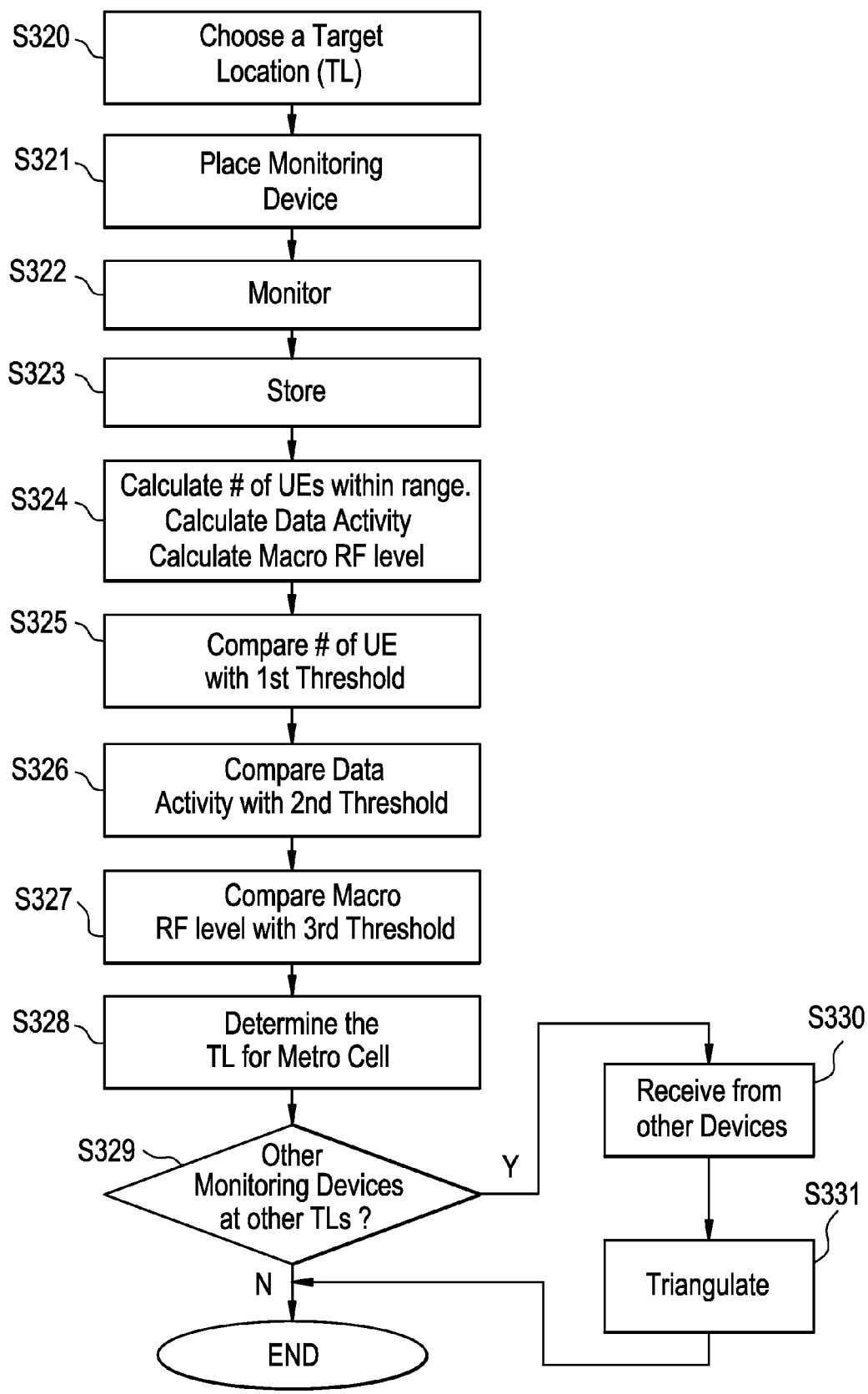
FIG. 3 is a flow chart describing a process for determining a target location for installing a metro cell base station, according to an example embodiment.

FIG. 3 is a flow chart describing a process for determining a target location for installing a metro cell base station, according to an example embodiment. A network operator of a communication system such as the communication system 100 of FIG. 1 chooses a target location such as target location 104 of FIG. 1, for placing a monitoring device such as the RF sniffer 103 of FIG. 1 (S320). The RF sniffer may be equipped with software algorithms based on which possible target location(s) for placing the RF sniffer is determined. The RF sniffer may further choose one of the target locations for placing the RF sniffer and/or subsequently allow the network operator to make the final decision on the target location. The software may take into account past target locations including the accuracy and suitability of past chosen target locations, etc. Alternatively, the network operator chooses the target location at random, based on results of empirical studies, past experiences etc.

Once the target location is chosen, the network operator and/or the technician in charge of installing the sniffer places the RF sniffer at the target location (S321). The network operator and/or technician may, for example, be given a global positioning system (GPS) coordination of the target location including the target location's latitude and longitude. The network operator uses such coordination to locate the target location and place the RF sniffer at the target location. Thereafter, the network operator configures the RF sniffer to start monitoring a certain type of data.

The RF sniffer, via a processor such as processor 212 of FIG. 2, monitors designated data (S322). As explained above, the processor stores the monitored data, such as the SRS information, onto a memory/storage medium such as memory 211 of FIG. 2 (S323).

For purposes of monitoring, the processor may monitor, for example, a LTE air interface's uplink (UL) channel for the SRS. A LTE wireless network uses Orthogonal Frequency Division Multiple Access (OFDMA) and Single Carrier FDMA (SC-FDMA) schemes for communication on downlink (DL) and uplink (UL) channels. The SRS is an UL reference signal defined in support of, for example, frequency dependent scheduling, link adaptation, power control and UL synchronization maintenance, all of which may be handled above a physical layer of a communication link. The SRS allows the macro cell base station (e.g., e-NodeB) to estimate a UE's radio channel information including, but not limited to, channel and channel gain estimates across the communication system's bandwidth, channel noise variance as well as timing and frequency offsets. The SRS is transmitted by a UE to an e-NodeB using a known sequence. The SRS is transmitted once or periodically based on e-NodeB scheduling. If the SRS is transmitted periodically, the UE-specific periodicity may be any one of, but not limited to, 2/5/10/20/40/80/160/320 ms as defined in 3GPP TS36.213 section 8.2. One particular advantage of utilizing the SRS signal is that most signals communicated between a given UE and a macro cell base station are encrypted and thus obtaining information from such signals require additional decryption processes. However, SRS signals are not encrypted and thus the information they contain may be utilized/obtained without any further intermediary encryption/decryption processes being necessary.

Thereafter, the processor determines a plurality of information including, but not limited to, a number of UEs within a predetermined range of the RF sniffer, an amount of data activity associated with each UE determined to be within the range of the RF sniffer and a radio frequency (RF) level of the macro cell base station at the location of the RF sniffer (S324). The range may be programmed into the processor and determined based on empirical studies including, but not limited to, past observations, studies, etc.

Figure 4:
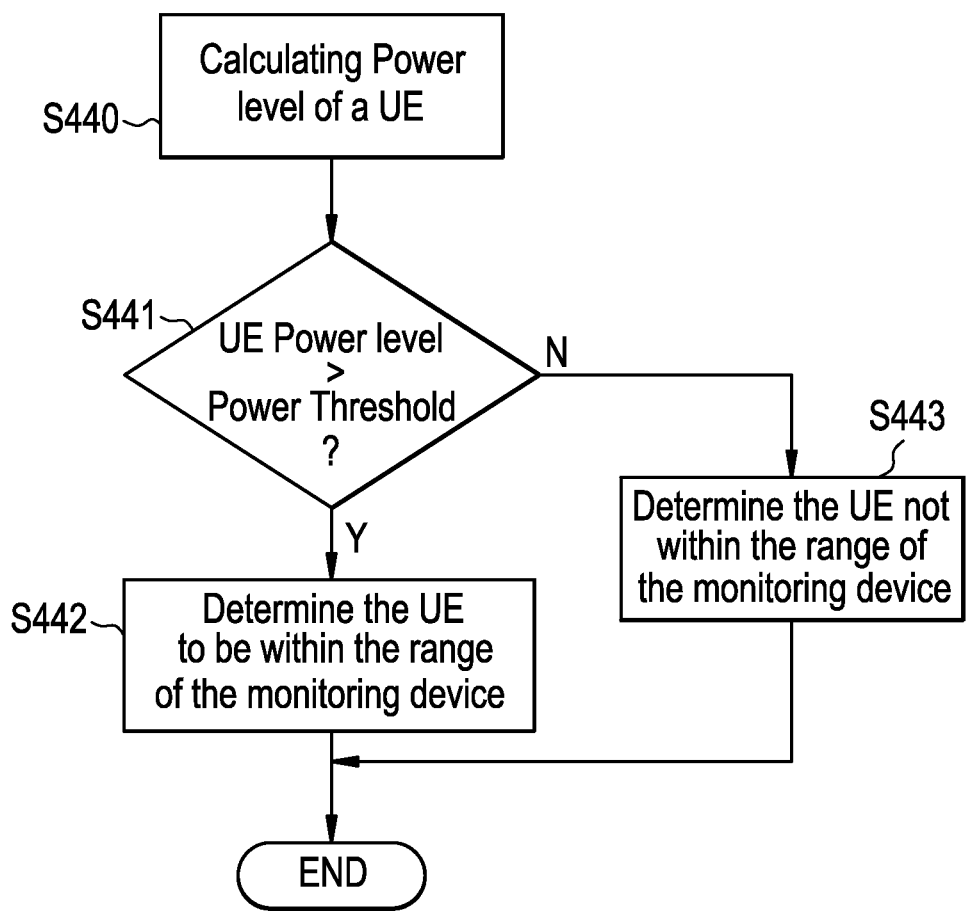
FIG. 4 is a flow chart describing a process for determining the number of UEs within a range of a monitoring device, according to an example embodiment.

FIG. 4 is a flow chart describing a process for determining the number of UEs within a range of a monitoring device, according to an example embodiment. Determining the number of UEs within a range of a monitoring device requires a power level of each UE be calculated. There may be many known methods for calculating a power level of a UE including, but not limited to, a time-domain based channel estimation, which will be described below as an example. However, such method is not intended to be limiting and thus the only contemplated method of calculating a power level of a UE. Other presently known and/or to be developed power level calculation methods are intended to be within the scope of the present subject matter. Hereinafter, the time-domain based channel estimation method is described.

Each e-NodeB has a unique root sequence, which is also known as CAZAC root sequence. Such root sequence may either be manually programmed into the RF sniffer or may automatically be learned by the RF sniffer through monitoring, for example, a System Information Block (SIB), which is available on the DL broadcast channel of the e-NodeB. A processor such as processor 212 of FIG. 2, converts the signal into a frequency-domain sequence upon detecting a SRS signal, which may contain multiple UE's channel information multiplexed together. Such conversion may be done via any known time-to-frequency domain conversion techniques such as a Discrete Fourier Transform (DFT) method. The transformed sequence is multiplied, element-wise, by the complex conjugate of the CAZAC root sequence of the SRS. The resulting sequence contains combined channel impulse responses of the multiplexed UEs. The resulting sequence is then converted back into the time domain by performing an inverse frequency-to-time domain conversion. Such conversion may be done via any known frequency-to-time domain conversion techniques such as an Inverse DFT (IDFT). Each UE's channel impulse response, converted back into time domain, is then obtained through a cyclic shift de-multiplexing method. With the channel information of each multiplexed channel now de-multiplexed, a simple conversion back to the frequency domain provides the power level of each UE (S440).

Once the power level of each UE is calculated, the processor compares each UE's power level with a power threshold (S441). The power threshold may be determined based on empirical studies such as past studies, observations, etc. An operator may statically program the power threshold into the processor. Alternatively, the RF sniffer may dynamically and through multiple observations learn the power threshold. If the calculated power level is greater than the power threshold, the processor determines that the UE is within the range of the RF sniffer (S442). If, however, the calculated UE power level is less than the power threshold, the process determines that the UE is not within the range of the RF sniffer (S443).

In an alternative embodiment, an RF sniffer, such as RF sniffer 203 of FIG. 2, is located at a target location where the RF sniffer may be able to detect SRS signals associated with more than one macro cell base station. For example, the target location may be at or close to a border between coverage areas of two adjacent macro cell base stations, (e.g., e-NodeBs). The RF sniffer will be equipped with CAZAC root sequence of each e-NodeB. The CAZAC root sequences may either be manually programmed into the RF sniffer or may automatically be learned by the RF sniffer through monitoring, for example, System Information Blocks (SIBs) available on the DL broadcast channel of each e-NodeB cell. Thereafter, in the process for determining the power level of UEs described above, the processor decodes the SRS associated with each e-NodeB using a root sequence corresponding to each e-NodeB.

Referring back to S324 in FIG. 3, the processor determines an amount of data activity associated with each UE determined to be within the range of the RF sniffer. Each macro cell base station (e.g., e-NodeB) records and maintains a per-call measurement for each UE with which the e-NodeB communicates. Per-call measurement data is an information record related to each call established between a UE and the e-NodeB. The per-call measurement records a series of key information for network optimization, such as a call type, a call drop type, power or quality of a received signal, a Signal to Interference plus Noise Ratio (SINR), block error rate, etc. As discussed above, the SRS information contains timing and frequency offsets. The processor may compute a correlation, using known correlation computation methods, between the per-call measurement data, the calculated power level at the SRS offset and the time of data measurement by the e-NodeB. The resulting correlation is indicative of and/or determines an amount of data activity for each UE such as data usage, number of calls made to and from each UE, etc.

Still referring to S324 in FIG. 3, the processor further determines a level of RF signal from the macro cell base station at the target location where the RF sniffer may be installed. The processor may determine the level of RP signal at the RF sniffer by demodulating the SRS of the macro cell base station in the DL channel for each UE.

At S325, the processor compares the determined number of UEs with a first threshold. The first threshold is indicative of the minimum number of UEs that need to be within a range of the RF sniffer, in order to be able to conclude that installing a metro cell base station at the target location makes financial sense for the network operator and provides efficient use of the network resources. The first threshold may be programmed into the RF sniffer by a network operator and may be determined based on empirical studies such as past observations, studies, network performances, etc.

At S326, the processor compares the amount of data activity for each UE, determined to be within the range of the RF sniffer, with a second threshold. The second threshold is indicative of an optimal level of data activity. Data activity of UEs that are below the second threshold is indicative of sub-optimal conditions for installing the metro cell base station at the target location. The second threshold may be programmed into the RF sniffer by a network operator or dynamically learned by the RF sniffer through multiple observations. The second threshold may be determined based on empirical studies such as past observations, studies, network performances, etc.

At S327, the processor compares the RF signal level of the macro cell base station (e.g., e-NodeB), at the RF sniffer with a third threshold. The third threshold is indicative of an RF signal level above which substantial interference from the macro cell base station will be experienced by the metro cell base station, if the metro cell base station is installed at the target location. The third threshold may be programmed into the RF sniffer by an operator or dynamically learned by the RF sniffer through multiple observations. The third threshold may be determined based on empirical studies such as past observations, studies, network performances, etc.

Once the comparisons at S325-S327 are performed, the processor determines the target location for installing the metro cell base station using the comparisons (S328). Such determination may take a tradeoff between the comparisons into consideration when determining whether the target location is an appropriate location for installing the macro cell base station. There may be scenarios in which the comparison at S325 may result in a determination that contradicts a determination based on the comparison at S326. For example, there may be a situation in which the number of UEs determined to be within the range of the RF sniffer, is significantly less than the first threshold, which may be indicative that the target location is not suitable for installing the metro cell base station. At the same time, the amount of data activity by the few UEs, determined to be within the range of the RF sniffer, may be greater than the second threshold, which may be indicative of the suitability of the target location for installing the metro cell base station. However, in reality such location may not be suitable for installing the metro cell base station because of how low the number of determined UEs is. Another situation may be one in which the number of UEs determined to be within the range of the RF sniffer, may be well above the first threshold but the amount of data activity for each UE is well below the second threshold.

Therefore, the processor may be equipped with algorithms that examine a tradeoff between results of comparisons at S325-S327 in order to determine the target location. Such algorithms for determining a tradeoff may be based on results of empirical studies carried out by network operators. For example, network operators may have developed statistical models that illustrate the results of comparisons performed for previously installed metro cell base stations such as the average number of UEs within the range deemed to be sufficient for determining that the target location is the appropriate location for installing the macro cell, average amount of data activity deemed to be sufficient and average RF level of the macro cell base station deemed acceptable for determining that the target location is the appropriate location for installing the macro cell.

The processor may alternatively provide recommendations to a network operator regarding the possible optimal target locations for installing the metro cell base station, from which the network operator may choose one. When determining whether the metro cell base station should be installed at the target location, the algorithm may take into consideration past observations such as results from other metro cell base stations installed at other locations including, but not limited to, number of UEs communicating with each of the installed base stations, the amount of data activity for each of the UEs within the range of the installed base stations, the macro cell base station's RF level at each of the installed base stations, etc. Alternatively, in face of such contradictory determinations at each step, the processor may alert the operator to use his or her judgment in making a final decision as to whether the metro cell base station should be installed at the target location or not. It is important to note that the target location determined at S328 may or may not be the same as the location at which the monitoring device is placed in S321.

At S329, the processor 212 determines whether there may be additional RF sniffers at other target locations. The processor may make such determination by receiving a signal indicative of the presence of other RF sniffers in its vicinity and may accordingly transmit a signal to other existing RF sniffer indicating its own existence. If there are other RF sniffers at other locations, each existing RF sniffer, upon performing the process described in S322-S327, will inform other existing sniffers of their respective findings, including measurement data and comparisons, with regard to the number of UEs determined to be within respective range of each RF sniffer, the amount of data activity for each UE determined to be within respective range of each RF sniffer, and the RF signal level from the macro cell base station at each RF sniffer (S330), each RF sniffer may communicate a record of data monitored by each RF sniffer during its operation.

Thereafter, the processor analyzes its own findings as well as the data received from other existing RF sniffers and accordingly determines a target location for installing the metro cell base station by techniques including, but not limited to, triangulation (S331). Such determined location may or may not be the same as the location at which any one of the existing RF sniffers are installed. In an example embodiment, the processor performs a triangulation based on its own comparisons as well as a correlation of monitored data and comparisons carried out by each of the other existing devices. Finally, if the processor determines, at S329, that there are no other RF sniffers present, the process in FIG. 3 ends.

In an alternative embodiment, the process described with respect to FIG. 3, is carried out at a remote processor that is located at a remote location as opposed to a processor of the RF sniffer such as the processor 212 of FIG. 2. The RF sniffer, such as RF sniffer 203, may optionally have a transmitter, as explained above, for transmitting its respective gathered data to the processor at the remote location. In an alternative example embodiment, the RF sniffer gathers and stores data on the RF sniffer's memory for a period of time ranging from a few days to a few weeks. Thereafter, the RF sniffer or the data on the RF sniffer may manually, by an operator or a technician, be removed from the location at which it was installed and transferred to the remote location where the data stored on the memory of the RF sniffer or the data removed from the RF sniffer may be transferred to a central computer, where the processor of the central computer carries out the process described in FIG. 3.

Figure 5:
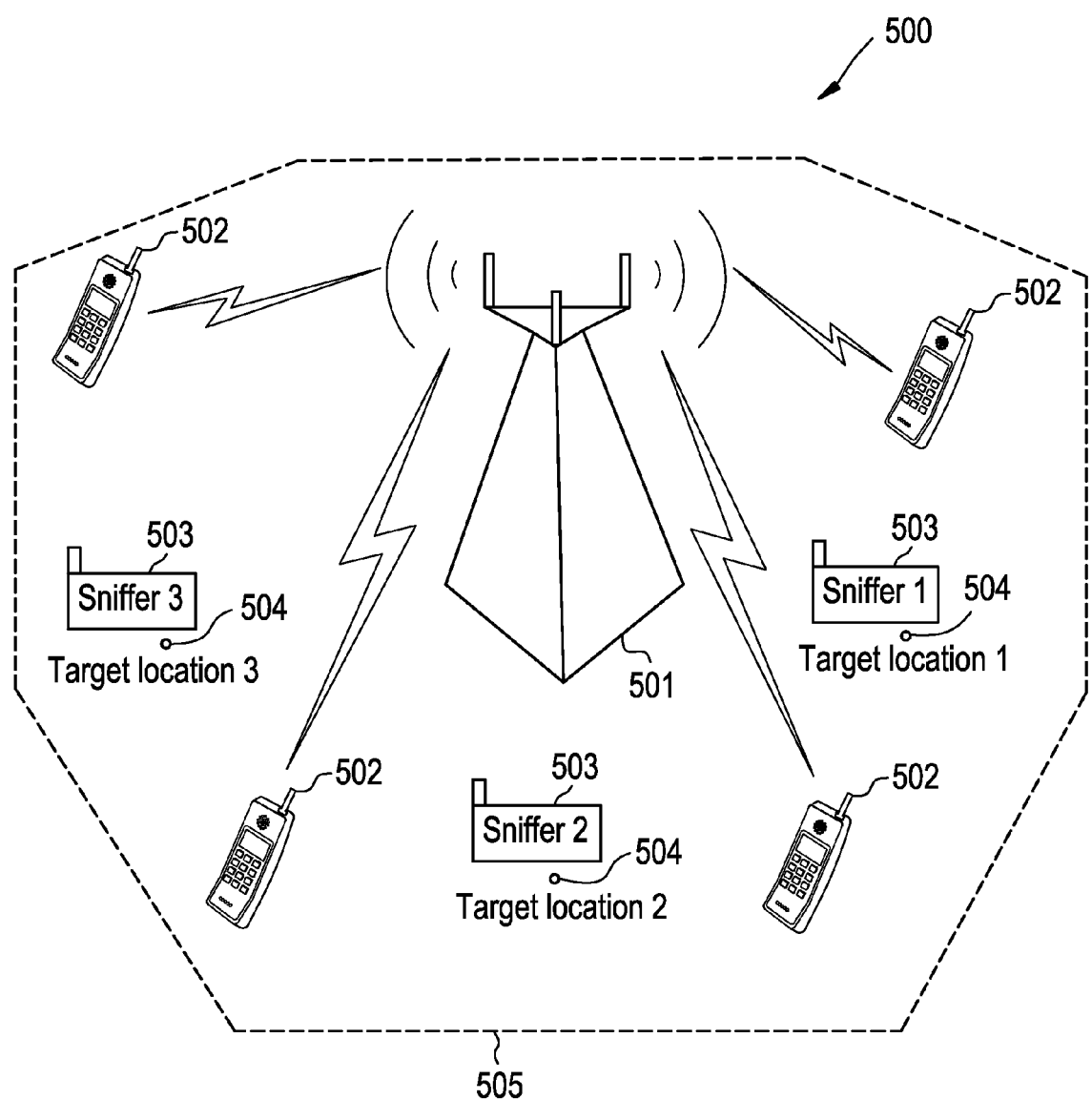
FIG. 5 illustrates an example embodiment in which multiple monitoring devices are placed at multiple target locations within a communication system.

FIG. 5 illustrates an example embodiment in which multiple monitoring devices are placed at multiple target locations within a communication system. Communication system 500 includes a macro cell base station 501 and a plurality of UEs 502. The macro cell base station 501 corresponds to the technology based on which the communication system 500 may operate. For example, the macro cell base station 501 may be any one of, but not limited to, an LTE evolved NodeB (e-NodeB) controller in an LTE network, a base station in a GSM network, etc. The UEs 502 may be any device capable of establishing a communication with the macro cell base station 501 including, but not limited to, a cellular telephone, a PDA, a laptop, a tablet computer, etc. Multiple monitoring devices such as LTE RF sniffers 503, each of which is described above in relation to FIG. 2, is placed at multiple target location 504 within the coverage area 505 of the communication system 500. As explained above in relation to FIG. 3, the sniffers 503 may be placed at or near the border of the coverage area 505, where the sniffer 503 may be able to detect and monitor control channel information of multiple neighboring macro cell base stations. Within the setting of FIG. 5, a triangulation may be performed, as explained above, in order to determine the target location for installing the metro cell base station.

While example embodiments have been described with reference to LTE based communication systems, developing similar methods and systems compatible for other types of communication systems (e.g., a GSM communication system) are intended to be within the scope of the present subject disclosure.

Variations of the example embodiments are not to be regarded as a departure from the spirit and scope of the example embodiments, and all such variations as would be apparent to one skilled in the art are intended to be included within the scope of this disclosure.

What is claimed:

1. A method for determining a target location for a metro cell base station comprising:
    calculating, via at least one monitoring device, at least one of a number of user equipments within a range of the at least one monitoring device, a radio frequency (RF) level of at least one macro cell base station and an amount of data activity associated with each one of the user equipments within the range;
    first comparing the calculated number of user equipments with a first threshold;
    second comparing the amount of data activity with a second threshold;
    third comparing the calculated RF level with a third threshold, the third threshold being determined such that if the metro cell base station is placed at the target location, no substantial signal interference from the at least one macro cell base station will be experienced by the metro cell base station; and
    determining, via the at least one monitoring device, the target location for the metro cell base station based on the first comparing, the second comparing and the third comparing.

2. The method of claim 1, further comprising:
    monitoring, via the at least one monitoring device, data associated with at least one control channel between a plurality of user equipments and the at least one macro cell base station; and wherein
    the number of user equipments, the amount of data activity and the RF level are calculated based on the monitored data.

3. The method of claim 2, wherein the at least one control channel is an uplink Sounding Reference Signal (SRS) channel.

4. The method of claim 3, wherein the determining includes:
    decoding the SRS channel using a root sequence of the at least one macro cell base station.

5. The method of claim 3, wherein the calculating the number of user equipments within the range of the at least one monitoring device includes:
    calculating a power level of a user equipment from among the plurality of user equipments monitored by the at least one monitoring device;
    comparing the power level with a power threshold of the at least one monitoring device; and determining whether the user equipment is within the range based on the comparing of the power level of the user equipment with the power threshold.

6. The method of claim 5, wherein the user equipment is determined to be within the range if the power level of the user equipment is greater than the power threshold.

7. The method of claim 3, wherein the calculating the amount of data activity includes:
determining a correlation between the monitored data and a measurement record for each connection established between each one of the user equipments and the at least one macro cell base station, the correlation being based on at least one of an SRS offset, the power level and a time at which the power level is calculated.

8. The method of claim 1, wherein the determining includes:
triangulating the target location based on the first comparing, the second comparing and the third comparing and a correlation of additional monitored data and additional comparisons received from an additional monitoring device.

9. The method of claim 8, wherein
the additional monitored data includes at least one of an amount of data activity of each of a plurality of user equipments within a range of the additional monitoring device, the RF level of the macro cell base station at the additional monitoring device and data associated with at least one control channel between the plurality of user equipments and the at least one macro cell base station; and
the additional comparisons include at least one of a comparison between the number of user equipment within the range of the additional monitoring device and the first threshold, a comparison between the amount of data activity associated with each one of the number of user equipment within the range of the additional monitoring device and a comparison between the RF level of the at least one macro cell base station at the additional monitoring device and the third threshold.

10. A monitoring device for determining a target location for a metro cell base station comprising:
a processor configured to,
calculate at least one of a number of user equipments within a range of the monitoring device, a radio frequency (RF) level of at least one macro cell base station and an amount of data activity associated with each one of the user equipments within the range,
first compare the calculated number of user equipments with a first threshold,
second compare the amount of data activity with a second threshold,
third compare the calculated RF level with a third threshold, the third threshold being determined such that if the metro cell base station is placed at the target location, no substantial signal interference from the at least one macro cell base station will be experienced by the metro cell base station, and
determine the target location for the metro cell base station based on the first comparing, the second comparing and the third comparing.

11. The monitoring device of claim 10, wherein the processor is further configured to monitor data associated with at least one control channel between a plurality of user equipments and the at least one macro cell base station; and wherein
the processor calculates the number of user equipments, the amount of data activity and the RF level based on the monitored data.

12. The monitoring device of claim 11, wherein the at least one control channel is an uplink Sounding Reference Signal (SRS).

13. The monitoring device of claim 12, wherein the processor is configured to determine the target location by decoding the SRS channel using a root sequence of the at least one macro cell base station.

14. The monitoring device of claim 12, wherein the processor is configured to calculate the number of user equipments by:
calculating a power level of a user equipment from among the plurality of user equipments monitored by the monitoring device;
comparing the power level with a power threshold of the monitoring device; and
determine whether the user equipment is within the range based on comparing the power level of the user equipment with the power threshold.

15. The monitoring device of claim 14, wherein the processor is configured to determine the user equipment to be within the range upon determining that the power level of the user equipment is greater than the power threshold.

16. The monitoring device of claim 12, wherein the processor is further configured to calculate the amount of data activity by determining a correlation between the monitored data and a measurement record for each connection established between the user equipment and the at least one macro cell base station, the correlation being based on an SRS offset, the power level and a time at which the power level is calculated.

17. The monitoring device of claim 10, wherein the processor is further configured to determine the target location by triangulating the target location based on the first comparing, the second comparing and the third comparing and a correlation of additional monitored data and additional comparisons received from an additional monitoring device.

18. The monitoring device of claim 17, wherein
the additional monitored data includes at least one of an amount of data activity of each of a plurality of user equipments within a range of the additional monitoring device, the RF level of the macro cell base station at the additional monitoring device and data associated with at least one control channel between the plurality of user equipments and the at least one macro cell base station; and
the additional comparisons include at least one of a comparison between the number of user equipment within the range of the additional monitoring device and the first threshold, a comparison between the amount of data activity associated with each one of the number of user equipment within the range of the additional monitoring device, and a comparison between the RF level of the at least one macro cell base station at the additional monitoring device and the third threshold.

19. A method for determining a target location for a metro cell base station comprising:
monitoring, via at least one monitoring device, data associated with at least one control channel between a plurality of user equipments and at least one macro cell base station;
calculating, via at the least one monitoring device and based on the monitored data, at least one of a number of user equipments within a range of the at least one monitoring device, a radio frequency (RF) level of the at least one macro cell base station and an amount of data activity associated with each one of the user equipments within the range, the calculating the number of user equipments including,
  calculating a power level of a user equipment from among the plurality of user equipments monitored by the at least one monitoring device,
  comparing the power level with a power threshold of the at least one monitoring device, and
  determining whether the user equipment is within the range based on the comparing of the power level of the user equipment with the power threshold; and
determining, via the at least one monitoring device, the target location for the metro cell base station based on at least one of the calculated number of user equipments within the range, the calculated RF level of the at least one macro cell base station and the calculated amount of data activity.

20. A monitoring device for determining a target location for a metro cell base station comprising:
a processor configured to,
  monitor data associated with at least one control channel between a plurality of user equipments and at least one macro cell base station,
  calculate, based on the monitored data, at least one of a number of user equipments within a range of the at least one monitoring device, a radio frequency (RF) level of the at least one macro cell base station and an amount of data activity associated with each one of the user equipments within the range, the processor being configured to calculate the number of user equipments by,
    calculating a power level of a user equipment from among the plurality of user equipments monitored by the at least one monitoring device,
    comparing the power level with a power threshold of the at least one monitoring device, and
    determining whether the user equipment is within the range based on the comparing of the power level of the user equipment with the power threshold, and
  determine the target location for the metro cell base station based on at least one of the calculated number of user equipments within the range, the calculated RF level of the at least one macro cell base station and the calculated amount of data activity.

\* \* \* \* \*